United States Patent [19]

Rialan et al.

[11] Patent Number: 4,583,206

[45] Date of Patent: Apr. 15, 1986

[54] DEVICE FOR THE SEQUENTIAL TRANSMISSION OF SIGNALS BY RADIO OR BY CABLE, BETWEEN A CENTRAL CONTROL SYSTEM AND DATA ACQUISITION APPARATUSES

[75] Inventors: Joseph Rialan, Meudon; Bernard Deconinck, Le Pecq; Gérard Thierry, Paris, all of France

[73] Assignee: Institut Francais du Petrole, Rueil-Malmaison, France

[21] Appl. No.: 411,133

[22] Filed: Aug. 24, 1982

[30] Foreign Application Priority Data

Aug. 24, 1981 [FR]  France ................. 81 16281

[51] Int. Cl.⁴ ....................... G01V 1/16; H04B 3/46
[52] U.S. Cl. .......................... 367/78; 367/77; 455/53; 340/539
[58] Field of Search ............. 367/20, 76–79; 455/53, 54; 340/539

[56]                References Cited
          U.S. PATENT DOCUMENTS

| 3,496,530 | 2/1970 | Brown et al. | 367/78 |
| 3,916,371 | 10/1975 | Broding | 367/78 |
| 4,152,691 | 5/1979 | Ward | 367/77 |
| 4,398,271 | 8/1983 | Cretin et al. | 367/20 |

OTHER PUBLICATIONS

GUS-BUS, 9/77, 19 pages, GUS Manufacturing, Inc.
Shave, "A Distributed Seismic Data Acquisition System . . . Link", 11/18/80, SRG Mtg.

*Primary Examiner*—Nelson Moskowitz
*Attorney, Agent, or Firm*—Millen & White

[57]                ABSTRACT

Device for the sequential transmission of signals by radio or by cable between a central control and recording station and local data acquisition apparatuses, comprising cables connecting said data acquisition apparatuses to the central station and radio transmission and reception means associated with each acquisition apparatus and with the central station, and switching means for establishing the cable connection and interrupting the radio connection between the central station and any particular apparatus for which said radio connection becomes defective as a result of obstacles on the path between the location of said apparatus and that of the central station.

14 Claims, 3 Drawing Figures

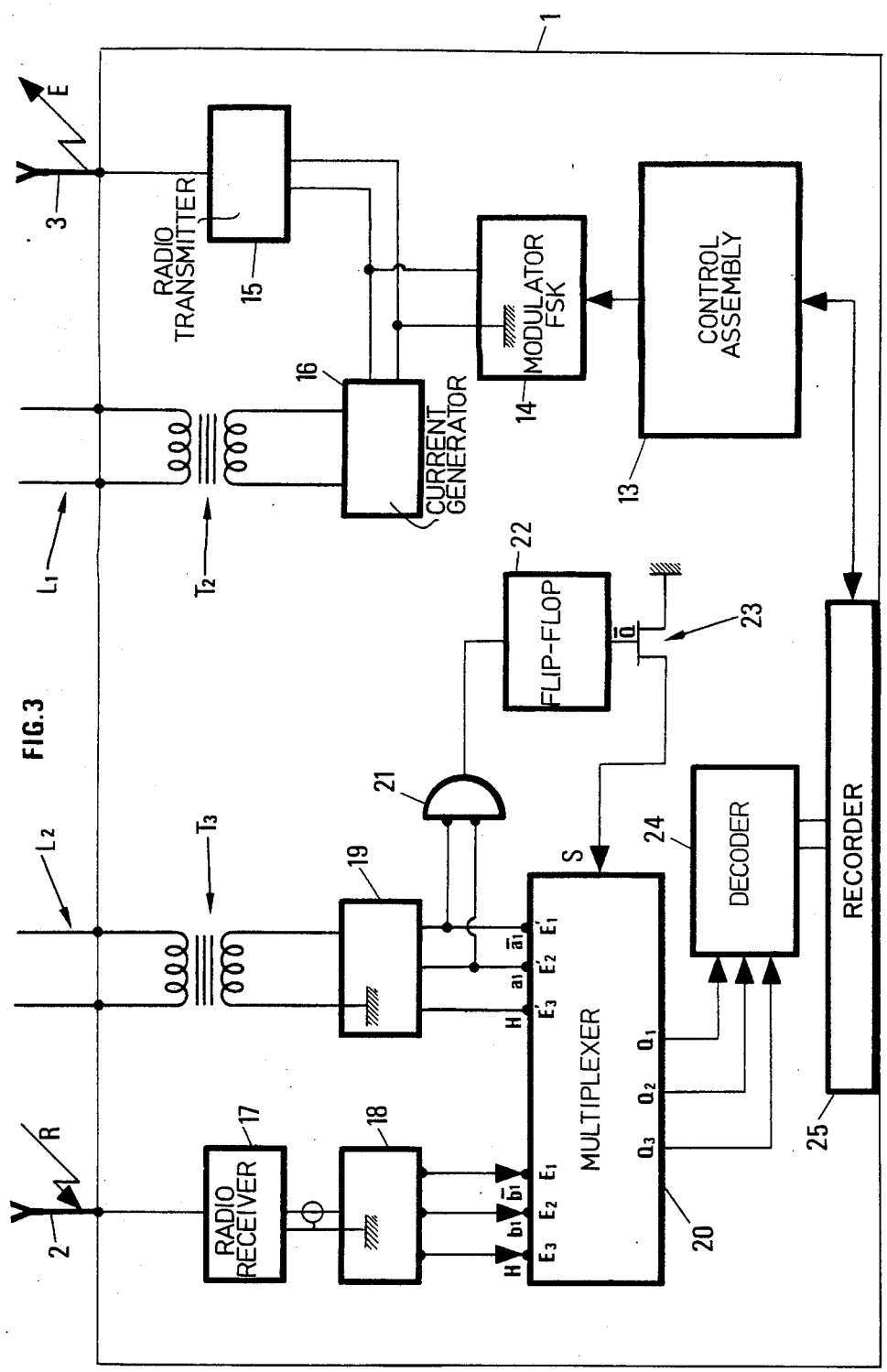

DEVICE FOR THE SEQUENTIAL TRANSMISSION OF SIGNALS BY RADIO OR BY CABLE, BETWEEN A CENTRAL CONTROL SYSTEM AND DATA ACQUISITION APPARATUSES

BACKGROUND OF THE INVENTION

1. Field of the Invention

This invention relates to a device for the transmission, by radio or by cable, to a central control and recording system, of data collected from a plurality of acquisition assemblies placed at different locations.

2. Prior Art

More precisely, the invention concerns a device for the sequential transmission, by radio or by cable, to a central control and recording system, of seismic data collected from a plurality of data acquisition assemblies contained in boxes or buoys placed at a certain distance from one another. The sequentially transmitted data are signals generated by seismic sensors (geophones or hydrophones) or sensor groups interconnected in series or in parallel, distributed along a seismic profile on survey, in response to echoes on subterranean layers of seismic waves transmitted through the earth by a suitable wave generator. The sensor or sensor groups arranged along the profile are distributed in several assemblies, the sensors of each assembly being connected to a data acquisition apparatus adapted to amplify the analog seismic signals simultaneously transmitted thereto, then to digitalize and record them.

The transmission of memorized data by each acquisition apparatus may be effected by radio or through transmission cables. The central control system transmits successively transmission orders, generally in coded form, to the different acquisition apparatuses. These transmission orders, preceded by an address signal for identification of the concerned acquisition apparatus, are conveyed through conducting lines or by radio towards the different boxes or buoys distributed over the survey area. When each acquisition apparatus has detected the specific transmission order concerning it, it transfers the data memorized therein to the control and recording system through a special connection cable or it connects itself for a certain time onto one or more common transmission lines.

The radio connections are more simple to effect but the quality of the transmissions may have defects when the land where the boxes of buoys are laid down is very uneven or when obstacles impede a good transmission of the Hertzian waves (dense woods, for example). Cable connections are generally very reliable irrespective of the nature and the surface of the land, but their use requires the time consuming and costly operations of placing and displacing conducting lines, particularly in the mountainous or boggy areas.

The transmission devices known for seismic prospecting on land, generally make use of radio connections, which are more easily effected than the cable connections and cannot be easily adapted to the alternative use of the other transmission mode, when the hertzian transmissions become defective.

SUMMARY OF THE INVENTION

The transmission device according to the invention is adapted indifferently to the use of radio or cable connections, when the transmission conditions make it possible or preferable to use one or the other of these connection modes to convey towards a central control and recording system the data collected in a plurality of data acquisition apparatuses placed at different locations.

It comprises radio transmission and reception means associated to the central control and recording system and to the data acquisition apparatuses. It also comprises at least one transmission cable adapted to be connected, on the one hand, to the control and recording system and, on the other hand, to the data acquisition apparatuses through interconnection means, and means for neutralizing the radio transmission and reception means associated to each acquisition apparatus when the connection of the latter to the transmission cable is effected.

The connection of each acquisition apparatus to the transmission cable is effected for example by means of detachable connectors and the neutralization of the radio transmission and reception means associated to each acquisition apparatus is effected by means of at least one switch, actuated by said connector. The central control and recording system comprises for example a selection assembly of receiving channels, adapted to connect to a recorder the transmission cable or the radio reception means associated to the central system, depending on whether the data transmitted from the acquisition apparatuses are respectively conveyed through one or the other way.

The automatic switching of the acquisition apparatuses onto the transmission cable or onto the radio transmission-reception means, depending on whether the cable is connected or disconnected, makes instantaneous the adaptation of the boxes or buoys distributed over the land to the selected transmission mode, particularly when the recording means of the central system are also automatically switched onto the selected data conveying way.

Other characteristics and advantages of the device according to the invention will be made apparent from the following description of an embodiment of the invention, selected by way of non limitative example, with reference to the accompanying drawings wherein:

DESCRIPTION OF THE PREFERRED EMBODIMENT

Figure 1:
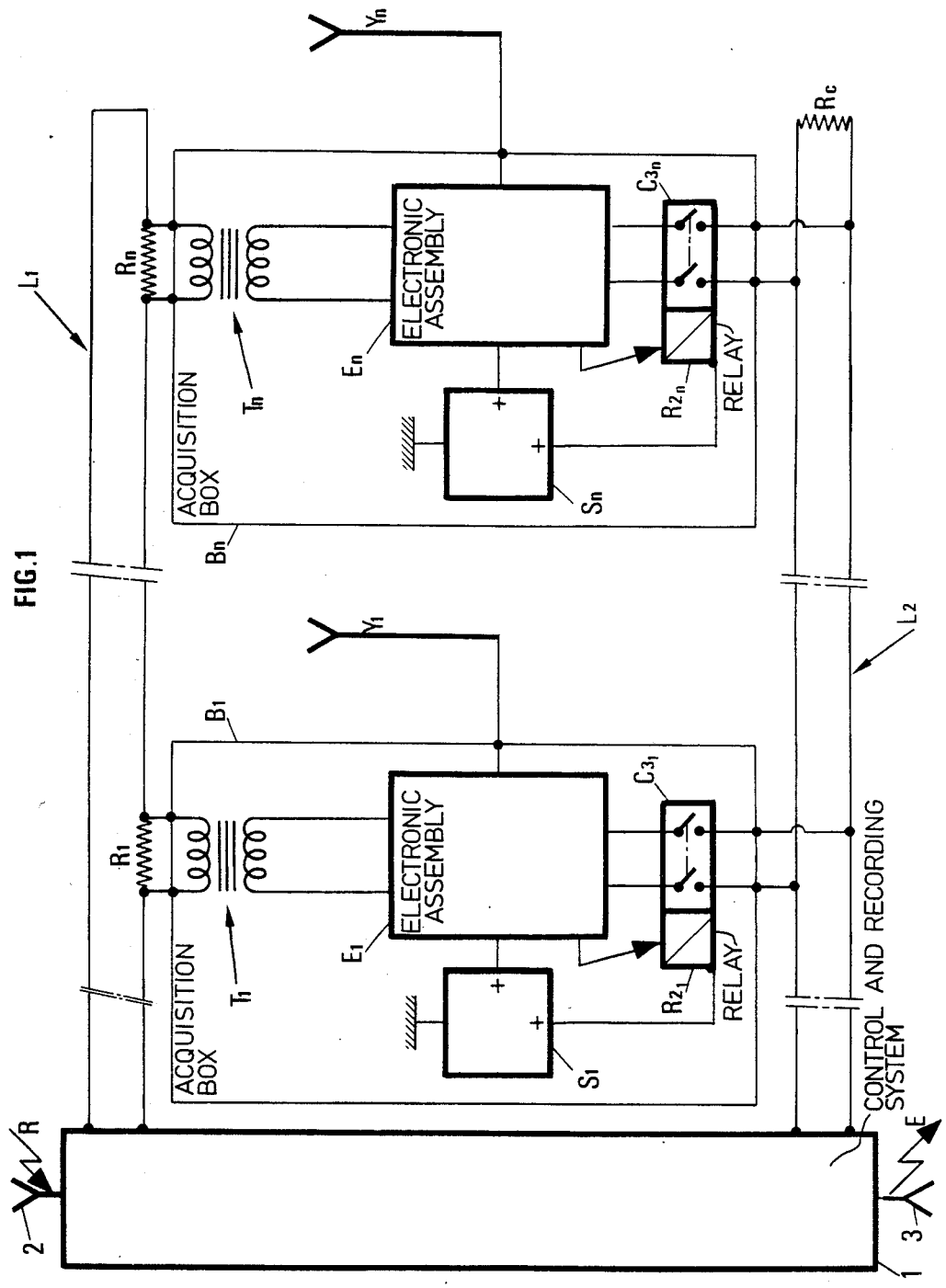
FIG. 1 shows any two boxes or buoys of a series, provided with radio transmission and reception means and connected through a transmission cable with two input lines of a control and recording system.

The transmission device shown in FIG. 1 is adapted to the transmission of signals between a control and recording system 1 placed on a vehicle, for example, and a plurality of boxes or buoys $B_1 \ldots B_n$ scattered over the land, each containing a battery of accumulators $S_1 \ldots S_n$ supplying electric power to an electronic assembly $E_1 \ldots E_n$ (shown more in detail in FIG. 2) comprising radio transmission and reception means (not shown) communicating, through antennae $Y_1 \ldots Y_n$ carried by the different boxes and antennae 2 and 3 placed on the vehicle, for example, with transmission and reception means included in the central control and recording system 1 (cf. FIG. 3). The transmission device also comprises a transmission cable consisting of two bi-wire lines $L_1$, $L_2$ which may be respectively connected to the central control and recording system and to the different boxes $B_1 \ldots B_n$ through interconnection means (not shown) which will be described below.

Line $L_1$ is assigned to the transmission of control signals. This line $L_1$, fed with a modulated current generator, included in the central system (FIG. 3), interconnects in series a plurality of resistors $R_1 \ldots R_n$. The voltages generated through the resistors $R_1 \ldots R_n$ by the passage of the modulated current, are respectively applied to the electronic assemblies $E_1 \ldots E_n$ contained in the boxes $B_1 \ldots B_n$, through the voltage increasing transformers $T_1 \ldots T_n$.

Line $L_2$ is assigned to data transmission from the acquisition apparatuses to the central system 1. Each electronic assembly $E_1 \ldots E_n$ may be connected onto the line $L_2$ by triggering a relay $R_{21} \ldots R_{2n}$ controlling double switches $C_{31} \ldots C_{3n}$ and transmit the data collected by the acquisition apparatus contained therein. The two conductors of line $L_2$ are interconnected through the characteristic impedance $R_c$.

The transmission of the control signals to the different boxes is effected by radio or through line $L_1$, by modulating a carrier signal at a first frequency $F_1$. The modulation is of a type known as FSK (frequency shift keying). The transmission of data from the boxes $B_1 \ldots B_n$ up to the central control and recording system 1 is effected by radio or by means of line $L_2$, by modulating a carrier signal at a second frequency $F_2$. The modulation is effected for example according to the code HDB 3, well known in the art. The transmission of data is effected sequentially by the different boxes. When receiving a transmission order concerning it specifically and after decoding, each of the boxes $B_1 \ldots B_n$ connects itself onto line $L_2$ be effecting the closure of the associated switches $C_{31} \ldots C_{3n}$.

Figure 2:
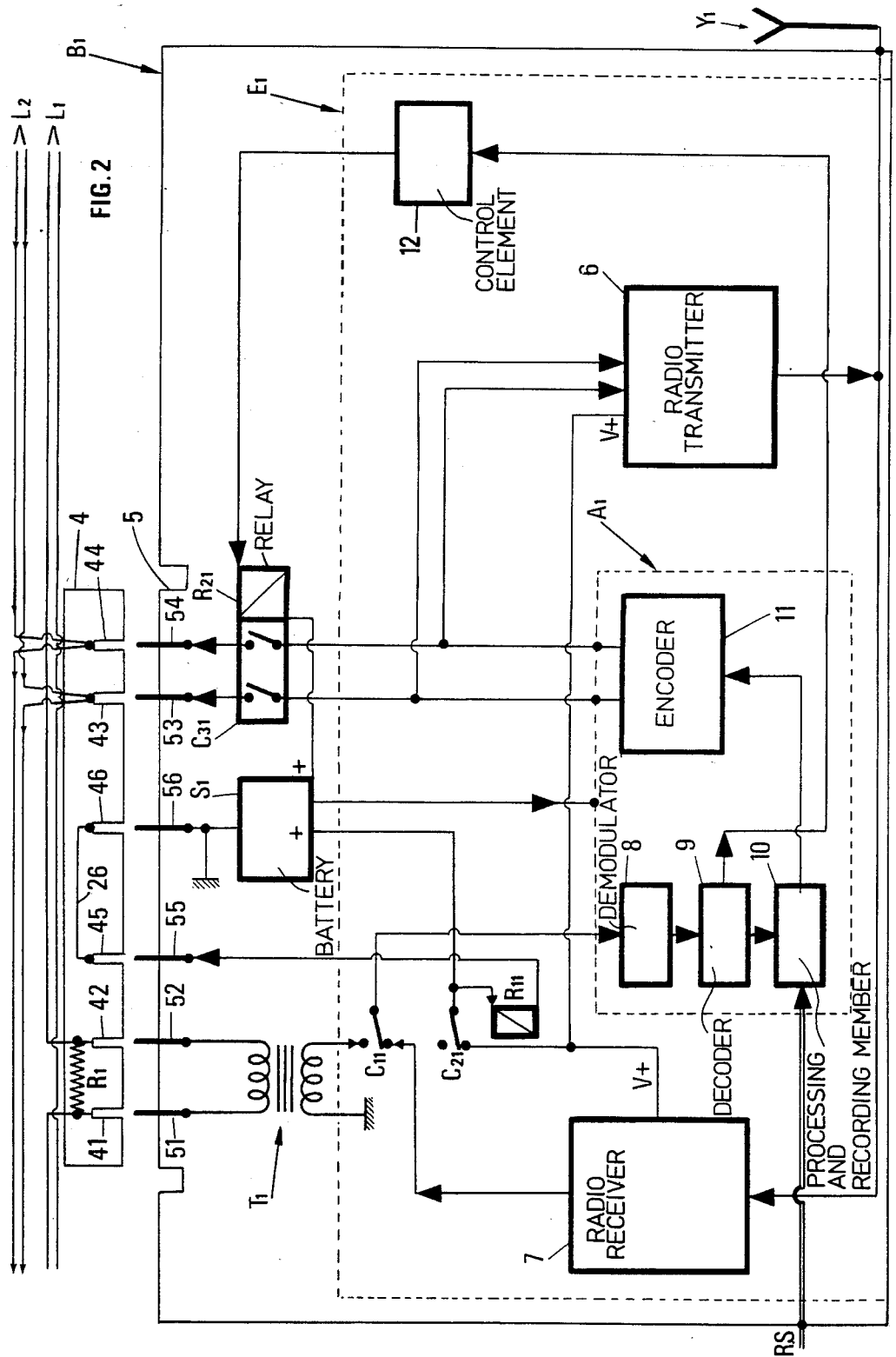
FIG. 2 diagrammatically shows an electronic assembly contained in each box and comprising a data acquisition apparatus associated with radio transmission and reception means, with neutralization means thereof and with interconnection means of a transmission cable, and FIG. 3 diagrammatically shows the control and recording system adapted to transmit control signals and to receive data on at least one of the two different transmission ways (cable or radio transmission).

The arrangement of each electronic assembly $E_1 \ldots E_n$ and the interconnection means of lines $L_1 \ldots L_2$ to each box ($B_1 \ldots B_n$) will be described with reference to FIG. 2. The bi-wire lines $L_1$ and $L_2$ are connected at regular intervals to a female connector 4. One of the conductor wires of line $L_1$ is connected to two plugs 41, 42 of said connector 4 which are joined by resistor $R_1$ (FIG. 1 also). The two conducting wires of the transmission line $L_2$ are respectively connected to two other plugs 43 and 44 and a conductor wire 26 short-circuits the two last plugs 45, 46 of connector 4.

Into this female connector 4 is adapted to fit a male connector 5 with six pins secured to box $B_1$. To plugs 41 and 42 correspond two pins 51, 52, electrically connected to the terminals of the primary winding of the transformer $T_1$ (FIG. 1). To plugs 43, 44, correspond two pins 53, 54 respectively connected to the two output terminals of switch $C_{31}$, actuated by the relay $R_{21}$ (see FIG. 1). To the two plugs 45, 46 correspond two pins 55, 56, respectively connected to a first terminal of a relay $R_{11}$ and to the negative or earthed pole of the battery of accumulators S1. The positive pole of the battery is connected to a second terminal of relay $R_{11}$ and to the common terminal of a two-input switch $C_{21}$ controlled through relay $R_{11}$. The input terminal of connector $C_{21}$, connected to the common terminal, in position of rest of relay $R_{11}$, is joined to the electric supply terminal V+ of a radio wave transmitter 6 and of a radio wave receiver 7 of the electronic assembly $E_1$. The relay $R_{11}$ also controls a switch $C_{11}$ with two inputs whose common terminal is connected to the input of a demodulator FSK (8) included in the data acquisition apparatus $A_1$ of the electronic assembly $E_1$. One of the input terminals of switch $C_{11}$, connected to the common terminal when the relay $R_{11}$ is not energized, is connected to the output of the radio receiver 7 where are available the signals received from the transmission means included in the control and recording system 1 (FIG. 1) The other input terminal of switch $C_{11}$ is connected to one end of the secondary winding of the transformer $T_1$, the other end thereof being connected to the earth of battery $S_1$.

The output of demodulator FSK 8 of the acquisition apparatus $A_1$ is connected to the input of a decoder 9 adapted to separate the transmitted orders from the demodulated signals and to control a processing and recording member 10 for the seismic signals RS received by the different receivers or receiver groups (not shown) placed on the land. By actuation of decoder 9, the processing and recording member 10 transmits the data it has collected to an encoding element 11 adapted to translate them according to the transmission code HDB 3, selected by way of example. The output terminals of the encoding element 11 are connected to two inputs of the double switch $C_{31}$ and also to the two input terminals of the radio transmitter 6.

A first terminal of relay $R_{21}$ is connected to the positive pole of battery $S_1$, the second terminal being connected to an activation element 12 actuated by decoder 9.

The input terminals of the radio receiver 7 and the output terminals of the radio transmitter 6 are respectively connected to antenna $Y_1$ (FIG. 1).

In each of the boxes, the acquisition apparatus is formed of the demodulator 8, the decoder 9, the processing and recording member 10 and the encoding element 11; the interconnection means are constituted by connectors 4, 5, transformer $T_1$ and switches $C_{11}$ and $C_{31}$, and the means for neutralizing the radio transmitter and receiver consist of the switch $C_{21}$ and the conducting wire 26 inside the female plug 4.

Each box, such as $B_1$, operates in the following manner:

When the female connector 4 is not connected, the relay $R_{11}$ is at rest and the positive terminal of the battery is connected through switch $C_{21}$ to the input terminals of the electric supply V+ of the radio wave transmitter and receiver 6 and 7 so as to permit exchanges of control signals and data between the box $B_1$ and the central control and recording system 1 (FIG. 1). The control signals received by the radio receiver 7 through antenna $Y_1$ are demodulated and decoded by elements 8, 9. When these signals concern box $B_1$, for example, the decoder 9 controls the transfer of the required data from the processing and recording member 10 to the encoding element 11. The received signals corresponding to data encoded by the latter are conveyed towards the inputs of the radio transmitter 6 which transmits them through antenna $Y_1$ to the radio receiving means of the control and recording system 1 (FIG. 1). The decoder 9 also controls the closure of relay $R_{21}$ through the activation element 12 and the closure of the double switch $C_{31}$. But the pins 53, 54 being disconnected, the signals transmitted to the male connector are not used. The data are exclusively conveyed by radio.

When connector 5 is fitted in connector 4, the short-circuit 26 then connects an input terminal of relay $R_{11}$ to the negative pole of battery $S_1$. The relay $R_{11}$ is energized and the switch $C_{21}$ interrupts the power supply of the radio wave transmitter and receiver 6, 7 which are neutralized and no longer operate. The switch $C_{11}$ having been triggered, the voltage at the secondary winding of transformer $T_1$, corresponding to the control voltage at the terminals of resistor $R_1$, is applied to demodulator FSK 8 of the data acquisition apparatus $A_1$. The control signals now are conveyed through line $L_1$.

Similarly, when the signals demodulated and decoded by elements 8 and 9 specifically concern the box $B_1$, the decoder 9 controls the transfer of the required data from the processing and recording member 10 to the encoding element 11 and also the closure of relay $R_{21}$. The signals issued from the encoding element 11 are applied, on the one hand, to the pins 53, 54 and, consequently, to the bi-wire line $L_2$ and, on the other hand, to the inputs of the radio transmitter 6. But the latter, as well as the radio wave receiver 7, being neutralized by the discontinuation of the electric supply (triggering of $C_{21}$), the signals corresponding to the data to be transmitted can be conveyed only through line $L_2$ towards the control and recording system 1.

The control and recording system 1 shown in FIG. 3 comprises a control assembly 13 adapted to generate order or test signals for the different boxes or buoys $B_1 \ldots B_n$. These signals are applied to the inputs of a modulator FSK 14 whose outputs are connected, on the one hand, to radio transmission means 15 connected to the transmission antenna 3 (FIG. 1) and, on the other hand, to a generator of modulated current 16 whose outputs are connected to the primary winding of a transformer $T_2$. The line $L_1$ is adapted to be connected to the secondary winding of said transformer.

The receiving portion of the control and recording system 1 comprises a transformer $T_3$ whose primary winding is adapted to be connected to the ends of the data transmission line $L_2$. The receiving antenna 2 (FIG. 1) is connected to the inputs of the radio receiving means 17. The outputs of said receiving means 17 and the outputs of the secondary winding of transformer $T_3$ are connected respectively to the inputs of two repeaters-regenerators or repeaters PCM 18, 19 (manufactured for example by EXAR under reference XRC 262). Each of them is adapted to deliver on three outputs, respectively the received signals coded according to code HDB 3 (outputs $a_1$, $b_1$) the conjugated signals of the preceding signals (outputs $\bar{a}_1$, $\bar{b}_1$) and a clock signal H generated from coded signals. The outputs of repeater PCM 18 are connected to three inputs $E_1$, $E_2$, $E_3$ of a multiplexer 20 of known type, those of repeater PCM 19 to three other inputs $E'_1$, $E'_2$, $E'_3$ of the same multiplexer. In addition, the outputs $a_1$, $\bar{a}_1$ of repeater PCM 19 are connected through an OR gate 21 to a re-energizable monostable flip-flop 22, of the CD 4057 type for example, whose output signal $\bar{Q}$ is applied, through a transistor 23, to the control input S of multiplexer 20. The elements referred to as 20 and 23 form the assembly for the channels selection.

The outputs $Q_1$, $Q_2$, $Q_3$ of multiplexer 20 are connected to the inputs of a decoder HDB 3 (24) adapted to reconstitute the signals collected from the different acquisition apparatuses $A_1 \ldots A_n$ and to transmit them to a recorder 25.

When the voltage at the input S of the multiplexer corresponds to the low level, the outputs $Q_1$, $Q_2$, $Q_3$ are respectively connected to the inputs $a_1$, $\bar{a}_1$, H. When said voltage corresponds to the high level, the outputs $Q_1$, $Q_2$, $Q_3$ are respectively connected to the inputs $b_1$, $\bar{b}_1$, H.

The control and recording system 1 operates as follows:

The signals generated by the control assembly 13 are simultaneously applied, after modulation, to the current generator 16 and to the transmission means 15. The control signals are transmitted by radio and also through line $L_1$ when the latter is connected to the secondary winding of transformer $T_2$. They are received by the radio receiver 7 (FIG. 2) of the different boxes ($B_1 \ldots B_n$) not connected to the transmission cable (connector 4 not fitted) and through said cable when the connection is effected and the relay $R_{11}$ energized.

The selection assembly of channels (20–23) of the receiving part of the control and recording system 1 is adapted to detect the coded signals appearing at the output terminals of the repeater 19 when line $L_2$ is connected to the primary winding of transformer $T_3$ and, in this case, to controll the connection of inputs $a_1$, $\bar{a}_1$, H to the outputs $Q_1$, $Q_2$, $Q_3$ of multiplexer 20.

When the selection assembly of channels (20, 23) detects coded signals at the output terminals of repeater 18 corresponding to the data received by radio, it conveys them to the outputs $Q_1$, $Q_2$, $Q_3$ of multiplexer 20.

When certain boxes are connected to the control and recording system 1 through line $L_2$ and some others by radio, the automatic switching of decoder HDB 3 (24) on the channel where the signals are successively received is effected by the selection assembly of channels (20–23). In the absence of signals at the output of repeater 19, the voltage 5 supplied by transistor 23 is at its high level and the outputs $Q_1$, $Q_2$, $Q_3$ of the multiplexer are automatically connected to the outputs of the radio signal receiving means 17 through the repeater 18. But, when the selection assembly of channels (20–23) detects signals transmitted through line $L_2$ and repeater 19, it brings the control voltage S to its low level, thereby providing for the conveyance of the signals produced by said repeater 19 to the outputs $Q_1$, $Q_2$, $Q_3$ of multiplexer 20.

When the transmission cable is not connected to the control and recording system, the control signals of the different boxes or buoys $B_1 \ldots B_n$ and the data originating therefrom are all conveyed by radio.

When the transmission cable is connected to the control and recording system 1, the control signals ar simultaneously transmitted through line $L_1$ and by radio. As above indicated, two cases are possible. When any given box is not connected to the cable, it receives the control signals and transmits the required data by radio. When it is connected onto the transmission cable, the radio transmitter-receiver 6, 7 included therein is neutralized and the informations which it exchanges with the central control and recording system 1 are conveyed exclusively through said cable.

This arrangement makes it possible to establish selective connections exclusively between certain of the boxes, when it is observed that radio connections between the latter are defective as a result of the surface ruggedness or the vegetation. Since no connection is established between the cable and the boxes or buoys for which the radio connections are satisfactory, a large part of the work for the systematic interconnection of the transmission lines, previously necessary, is avoided.

It would not be outside the scope of the invention to replace the switches C11, C21, C31 and their control relays by any other equivalent electronic means.

What is claimed is:

1. A device for successively effecting the sequential transmission of signals selectively by radio and selectively by cable between a central control and data recording system and a plurality of data acquisition apparatuses placed at different locations, the transmission system comprising: radio transmission and reception means in said central control and recording system, and in said data acquisition apparatuses; at least one transmission cable for connecting the control and recording system and the data acquisition apparatuses which system and apparatuses are provided with detachable connectors for the transmission cable, means for neutralizng the radio transmission and reception means in each of said acquisition apparatus when the connection of the latter by cable is established, said neutralizing means comprising a first switch controlled by a relay receiving its control electric voltage through a conducting connection created by assembling of said connectors, actuation of said relay interrupting the electric supply of said radio transmission and reception means associated to said acquisition apparatus; wherein the control and recording system comprises a generator of modulated control signals and connection means for transmitting the control signals to radio transmission means associated with the control and recording system and with the transmission calbe when the latter is connected, said cable interconnecting in series a plurality of resistors, each acquisition apparatus including a demodulator for sensing the electric voltage across each of said resistors.

2. A device according to claim 1, comprising a second switch adapted to feed the demodulator either with the voltage across said resistor, through a voltage increasing transformer, or with the voltage at he output terminal of the radio reception means in each acquisition apparatus.

3. A device according to claim 1, wherein the generator of modulated control signals is a current source.

4. A device according to claim 2, wherein the interconnection means comprises a third double switch adapted to intermittently connect said acquisition apparatus to said transmission cable.

5. A device according to claim 4, wherein each acquisition apparatus comprises means for coding the data to be transmitted, this coding means being permanently connected to the radio transmission means in said acquisition apparatus and to the transmission cable through a third switch.

6. A device according to claim 5, wherein each acquisition apparatus comprises a decoding element for controlling the third switch.

7. A device according to claim 6, wherein the transmission cable comprises a line for transmitting control signals to the acquisition apparatuses, said control line interconnecting in series said resistors and at least one return line for the transmission of data to the control and recording system, said return line being connected to each acquisition apparatus through the third switch.

8. A device according to claim 7, wherein the central control and recording system comprises terminals for said cable, a selection assembly for sensing signals on said terminals and received by said radio reception means in said central system and for connecting the transmission cable or the radio receiving means to recording means depending on whether the data transmitted sequentially by the acquisition apparatuses are conveyed by radio or through the transmission cable.

9. A device according to claim 8, wherein the selection assembly comprises a multiplexer and control elements adapted to detect the presence of signals on the transmission cable.

10. A seimic transmission system for transmission of signals selectively by radio and selectively by a cable having first and second lines, the signals being transmitted between a central control and data recording assembly and a plurality of data acquisition apparatuses disposed at different locations and provided with means for memorizing seismic data, the transmission system comprising: radio transmission and reception means associated with the central control and recording assembly and with the data acquisition apparatuses, wherein said central control and data recording assembly is provided with inputs and outputs for a transmission cable, and wherein said central control and data recording assembly includes a means for generating coded control signals; a means for transmission of said control signals to outputs for said cable and to said radio transmission means in said assembly; a means in said assembly for sensing control signals and data from said data acquisition apparatuses on inputs for said cable and on radio reception means, and means for directing signals recived on said inputs or by said radio reception means to a recording means; wherein each of said data acquisition apparatuses is provided with terminals for said transmission cable and means for neutralizing the radio transmission and reception means in said data acquisition apparatus when the transmission cable is connected to said terminals said systems further including: a detachable connector for connecting each of said data acquisition apparatuses to the cable which includes at least first and second lines, the first line interconnecting in series a plurality of resistors, each of said data acquisition apparatuses comprising a demodulator for sensing electric voltage across each of said resistors, said neutralizing means in each of said data acquisition apparatuses comprising a first switch actuated by engagement of said connector for interrupting the electric supply of said radio transmission and reception means.

11. A seismic transmission system according to claim 10, comprising a second switch actuated by engagement of said connector for feeding the demodulator either with the voltage across a corresponding resistor of the one issuing from the radio reception means.

12. A seismic transmission system according to claim 10, wherein the means in the control and data recording assembly for transmission of control signals comprises a current source for feeding said line interconnecting in series the plurality of resistors.

13. A seismic transmission system according to claim 10, comprising a third switch in each of said acquisition apparatuses for intermittently connecting said memorizing means to a second of said lines in the cable.

14. A seismic transmission system according to claim 13, comprising a decoding element in each of said acquisition apparatuses for controlling the third switch.

* * * * *